US008311668B2

(12) United States Patent
Lee et al.

(10) Patent No.: US 8,311,668 B2

(45) Date of Patent: Nov. 13, 2012

(54) AUTOMATIC FEEDER CONTROL SETUP BASED ON CLIENT MAILSTREAM

(75) Inventors: Raymond Lee, Palatine, IL (US); Brian Bowers, Mundelein, IL (US)

(73) Assignee: Bell and Howell, LLC, Durham, NC (US)

(*) Notice: Subject to any disclaimer, the term of this patent is extended or adjusted under 35 U.S.C. 154(b) by 573 days.

(21) Appl. No.: 12/581,523

(22) Filed: Oct. 19, 2009

(65) Prior Publication Data

US 2011/0089089 A1 Apr. 21, 2011

(51) Int. Cl.

*G06F 7/00* (2006.01)

*G06K 9/00* (2006.01)

(52) U.S. Cl. ........ 700/226; 700/221; 700/223; 700/224; 700/225; 700/227

(58) Field of Classification Search ........................ None

See application file for complete search history.

(56) References Cited

U.S. PATENT DOCUMENTS

| | | | | |
|---|---|---|---|---|
| 6,581,097 | B1 * | 6/2003 | Lynch et al. | 709/226 |
| 2008/0179225 | A1 * | 7/2008 | Bowers et al. | 209/584 |
| 2008/0291486 | A1 * | 11/2008 | Isles et al. | 358/1.15 |

* cited by examiner

*Primary Examiner* — Gene Crawford

*Assistant Examiner* — Yolanda Jones

(74) *Attorney, Agent, or Firm* — McDermott Will & Emery LLP

(57) ABSTRACT

Systems, methods, and an article of manufacture for automatically configuring a feeder system of a mail sorting system are shown and described. The feeder system is configured in accordance with a customer's mailing parameters. This improves the performance of the mail sorting system. In various examples, customer information associated with a processing job is received. A feeder profile is also received. The feeder system is automatically configured according to parameters of one or more of the customer information and feeder profile.

19 Claims, 6 Drawing Sheets

AUTOMATIC FEEDER CONTROL SETUP BASED ON CLIENT MAILSTREAM

TECHNICAL FIELD

The present disclosure relates to a method and system for processing mail items within a document processing system.

BACKGROUND

Document processing facilities often use high speed document processing machines such as sorters, to sort and direct mail items appropriately to one or more mail bins for distribution. The efficiency of a sorter is generally dependent upon various factors, one of which is the rate at which mail items can be fed by a feeder system as input onto the sorter's transport path. Typical feeder systems employ one or more motor driven belts in combination with a set of picker fingers, advance paddles or other means to progressively advance a plurality of mail items onto the transport path. Moreover, the feeder operates based on one or more feeder control settings, such as a specified gap or pitch threshold between successive mail items, vacuum suction pressure to be applied for feeding of items onto the transport, belts motor acceleration/deceleration rates, retard belt speed, etc. The more expedient the input of the mail items by the feeder system in conjunction with the aforementioned combination of factors and control elements, the more expeditiously the sorter can process mail items.

Of course, a typical sort operation may require the input and eventual processing of thousands of mail items, where a specific mailing or group of items requiring process may belong to a particular customer. In fact, it is not uncommon for a sort processing environment to process multiple different mailings for different customers on a single sort processing device within a typical operating day. To the extent the differing customer mailings vary by item size or type, material type, processing requirements, etc.—the feeder control settings of the feeder system must be adjusted accordingly on a per customer basis. Unfortunately, typical feeder systems must be manually adjusted at the time of a customer changeover, such as via an instrument panel operable in connection with the sorter or via a graphical user interface based platform. So, for example, the operator may adjust a control knob from the instrument panel that increases or decreases belt speed, gap length, etc. associated with the feeder system. This is essentially a "trial-and-error" or "tuning" based approach to calibration of the feeder system as it is performed typically by execution of a test run. In other instances, the feeder system may be set to operate in accord with a few pre-determined feeder modes (e.g., pitch feeder mode, gap feeder mode, gap and pitch feeder mode). Of course, these pre-determined settings may themselves require additional tuning to accommodate different mailings—one size of feeder mode does not fit all customer, site or job requirements. Either way, the operator inherently defines or establishes the feeder settings manually.

There is currently no means for automating the association and loading of a particular feeder system profile for affecting a feeder system prior to the run of a particular customer mailing (job) to be processed, so as to avoid the manual tasks mentioned above. Furthermore, there is currently no means for enabling an association between feeder control settings and a particular customer mailing based on differing processing contexts. For example, Feeder Profile 1 relative to Customer 1 for usage at Site 1 may not be suited for usage at a Site 2 as the sites may feature differing machines and other resources to which the feeder profile must be suited. Feeder profile adaptation relative to the specific machine, job and/or site in which the mailing is being processed is necessary to avoid manual adaptation and increase mail production and processing capability.

SUMMARY

Describe herein are systems, methods, articles of manufacture, and other means for automatically configuring a feeder system. These techniques allow the feeder to be controlled without intervention from a system operator. That is, the mechanical adjustments of various mechanical components of the feeder system are configured, adjusted, readjusted, and manipulated automatically.

In one instance, a method of automatically configuring a feeder system of a mail sorting system to optimize the performance of the sorter versus the characteristics of the customer's mail is described. The method includes receiving, at a sorter control system associated with the mail sorting system, customer information associated with a processing job and obtaining at the sorter control system, from a database, a feeder profile associated with the unique customer identifier. The customer information includes a unique customer identifier and parameters for the processing job. The feeder profile includes parameters for controlling the operation of the feeder system of the mail sorting system. The method also includes receiving the feeder profile at a feeder control system in communication with the sorter control system and automatically configuring, by the feeder control system, the feeder system according to the parameters of the feeder profile associated with the unique customer identifier prior to the execution of the processing job by the mail sorting system. The feeder control system is capable of configuring one or more parameters of the feeder system.

In one example, the step of automatically configuring the feeder control system according to the parameters of the feeder profile includes configuring a parameter selected from the group consisting of: gap threshold between successive items of the processing job; pitch threshold between items of the processing job; vacuum suction pressure to be applied for feeding items of the processing job onto a transport; magazine feed velocity; magazine mail stack pressure; belt motor acceleration rate; belt motor deceleration rate; and retard belt speed.

In other examples, the step of obtaining the feeder profile includes sending a request for retrieval of the feeder profile, including the unique customer identifier, over a network from the sort control system to a job management system having access to the database, and receiving the feeder profile over the network at the sort control system from the job management system.

In some examples, the step of receiving the customer information associated with the processing job includes receiving the customer information, over a network from a job management system in communication with the sort control system. The feeder profile can be a default feeder profile associated with the sort processing device. The feed profile can also be a customized feeder profile associated with the sort processing device.

In another instance, a method of sorting documents using a sort processing device is shown and described. The method includes sorting, by the sort processing device, a first plurality of mail items according to first sorting parameters associated with a first customer, receiving, at the sort processing device, second sorting parameters associated with a second customer, automatically configuring the feeder system according the second configuration setting at the completion of the first sorting job, and sorting, by the sort processing device, a second plurality of mail items according the second sorting parameters associated with the second customer.

The first sorting parameters include first configuration settings for a feeder system of the sort processing device. The second sorting parameters include second configuration settings for the feeder system of the sort processing device. In some examples, the first customer and the second customer are the same. Also, the first customer and the second customer can be different.

In another instance, a document processing system is shown and described. The document processing system includes a sort processing device, a sorter control system, and a feeder control system. The sort processing device has an integral feeder system. The sorter control system is in communication with the sorting device and a database. The sorter control system receives customer information associated with a processing job. The customer information including a unique customer identifier and parameters for the processing job and obtaining from the database a feeder profile associated with the unique customer identifier. The feeder profile includes parameters for controlling the operation of the feeder system of the sort processing device. The feeder control system is in communication with the feeder system and the sort control system. The feeder control system receives the feeder profile and automatically configures the feeder system according to the parameters of the feeder profile associated with the unique customer identifier prior to the execution of the processing job by the sort processing device.

In some examples, the database is resident on a communications network. The system can also include a job management system in communication with the sort control system. The job management system stores the customer information and parameters for the processing job.

In some examples, the feeder profile includes configuring a parameter selected from the group consisting of: gap threshold between successive items of the processing job; pitch threshold between items of the processing job; vacuum suction pressure to be applied for feeding items of the processing job onto a transport; magazine feed velocity; magazine mail stack pressure; belts motor acceleration rate; belt motor deceleration rate; and retard belt speed. In some examples, the feeder profile is a default profile. Also, the feeder profile can be a custom profile. The feeder profile can be represented by a unique identifier.

In another instance, an article of manufacture is shown and described. The article includes a machine readable storage medium and executable program instructions embodied in the machine readable storage medium that when executed by one or more programmable systems in communication with a document processing system having a sorter processing device that causes the one or more systems to perform functions that automatically configure a feeder system of the sorter processing device. The functions include, receiving, at a sorter control system associated with the sorter processing device, customer information associated with a processing job and obtaining, at the sorter control system, from a database, a feeder profile associated with the unique customer identifier. The customer information includes a unique customer identifier and parameters for the processing job to be executed. The feeder profile includes parameters for controlling the operation of the feeder system of the sorter processing device.

The functions also include receiving the feeder profile at a feeder control system in communication with the sorter control system and automatically configuring, by the feeder control system, the feeder system according to the parameters of the feeder profile associated with the unique customer identifier upon receipt of the feeder profile prior to the execution of the processing job by the sort processing device. The feeder control system is capable of configuring one or more parameters of the feeder system.

BRIEF DESCRIPTION OF THE DRAWINGS

The drawing figures depict concepts by way of example, not by way of limitations. In the figures, like reference numerals refer to the same or similar elements. In the figures, like reference numerals refer to the same or similar elements.

DETAILED DESCRIPTION

Described herein is a system and method for automating the loading of a particular feeder system profile to a document processing device such as a sorter just prior to the run of a particular customer mailing (job) to be executed by the document processing device. In effect, the feeder system profile settings which impact feeder system operation is automatically loaded relative to the job to be next executed without necessitating the following: further manual adaptation of the feeder system behavior, trial-and-error or fine tuning based calibration of feeder settings—as performed by running a small sampling of a given mailing prior to full or actual job execution, etc.

As used herein, a "mail item" refers to any article having human or machine readable content generated thereon, and particularly that intended for delivery to a given recipient. Mail items may include, but are not limited to, envelopes, newsletters, newspapers, magazines, post cards, parcels or packages of varying thicknesses (e.g., flat mail), coupon booklets, brochures, and other like documents. Such documents may or may not be generated for the purpose of being distributed via an outgoing distribution channel (e.g., delivery company, postal authority), but rather, may be generated for direct/personal carry, private delivery, or internal distribution. Furthermore, a plurality of mail items intended for processing as a group, such as in relation to a common customer, mail processing task to be executed, criteria or the like, is referred to herein as a "mailing."

Also, as used herein, the phrase "document or mail processing system" refers to any high speed transport device(s) capable of processing mail items at considerably high rates with considerably high precision. Document processing systems may include, but are not limited to, inbound mail sorting equipment, outbound mail sorting equipment, and even various forms of inserter machines, mail integrity systems or the like for office, commercial, or industrial settings. When devices of this nature process a particular mailing or group thereof responsive to a set of pre-established sort processing criteria or requirements, this is referred to as a "job." While the following discussion will present the teachings in exemplary fashion with respect to a sorter device, it will be apparent to those skilled in the art that the teachings may apply to any type of document processing device requiring pre-run adaptation of specific device control settings to execute a job. Namely, such settings may include but are not limited to: gap and/or pitch maintenance settings between items in process, vacuum suction pressure to be applied to enable mail item pickoff, motor acceleration/deceleration rates, distance past detect sensor, retard belt speed, magazine belt speed, sensor activation patterns, etc. Of course, these will vary by sorter design, mail mix to be processed, etc.

Figure 1:
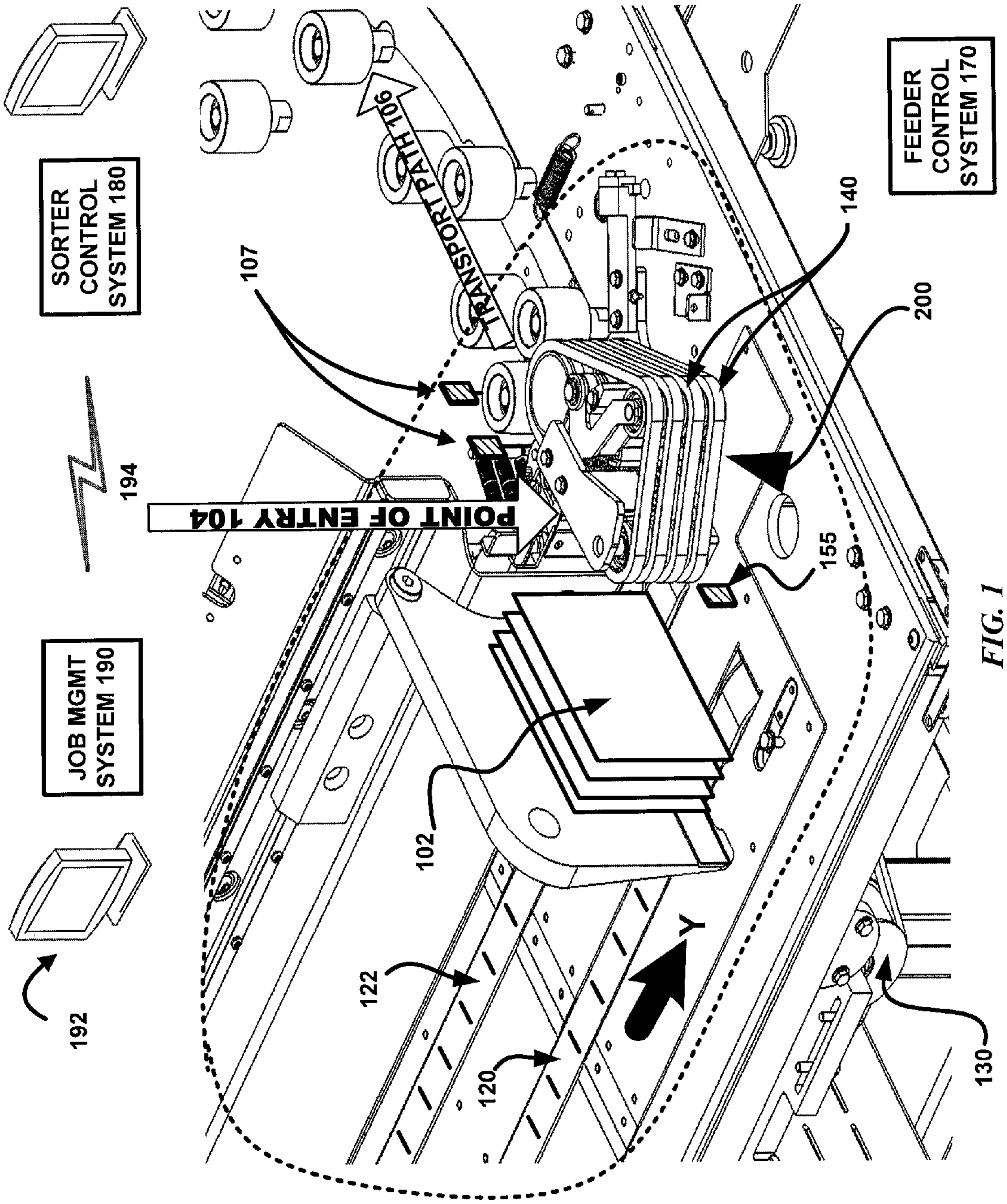
FIG. 1 depicts an exemplary feeder system for advancing mail items to a point of entry of a transport path of a sort processing device.

FIG. 1 depicts an exemplary feeder system 100 for advancing a stack of mail items 102 to a guide mechanism 200 intended to guide a mail item to an entry point 104 of a transport path 106 of a sorter device. Typically, feeder systems 100 comprise the front end portion of a sorting device to enable the loading and staging of mail items for entry onto the sorter's mechanical transport path 106. The feeder system 100 may employ various physical elements (e.g., drive belts, rollers, and pulleys) for receiving mail items as input and readying said mail items for processing by the other components of the sorter as it traverses the transport path 106. In the context of the examples presented herein, the feeder system 100 may also comprise various control devices (e.g., motors, sensors, programmable controllers) that operate independently or interdependently to effectively handle mail items. All of these devices and components may or may not be regulated by a central feeder control mechanism 170, which coordinates, regulates and tracks the actions of said devices within the feeder system 100. Generally, the various actions, tolerances, settings and thresholds expected to be maintained or achieved by the physical elements that comprise the feeder system 100 in order to control its behavior are defined or established as feeder profile data.

The feeder control system 170 and its various control settings as described above are generally established or adjusted in advance of a particular job run by the loading of feeder profile data to the feeder control system 170. For example, the feeder control system 170 may employ a graphical user interface (GUI—not shown) that enables establishment or selection of desired tolerance settings. The feeder profile data is processed by the feeder control system 170 as a control data file having the appropriate instructions, tolerances and settings to be carried out by the feeder system 100 to enable customized execution. So, for example, the profile data file may indicate a desired rate of rotation (e.g., as measured in inches per second) for a belt motor drive 130 that drives magazine belts 120 and 122 to advance mail items 102 in direction Y towards the guide mechanism 200. As another example, the feeder profile data may indicate the rate at which the gripper belts 140 of the guide mechanism 200 operate to advance mail items 102 through a point of entry 104. As yet another example, the feeder profile data may establish presence detector 155 settings, gap detector 107 settings, etc. The tolerances selected for such exemplary settings may vary from one mailing to be processed to the next.

In other instances, the feeder control system 170 may further be integrated or communicable with a sorter control computer 180 configured for interaction with the sorter. The sorter control computer 180 is an executable module for coordinating, regulating and tracking the actions of the sorter system and/or its various associated components, including but not limited to the transport mechanism 106, imaging devices, sensor devices, print modules, etc. Furthermore, the sorter control computer 180, while enabling local control of a given sort processing device, may communicate over a network 194 with a job management system 190 in order to receive pertinent job, customer or machine processing instructions. So, for example, the sorter control computer 180 may download relevant control data files from the job management system 190 (i.e., feeder profile data, sorter profile data, imaging system profile data as maintained in a database) which may then be relayed to the appropriate component to enable its execution.

Regardless of configuration, those skilled in the art will recognize that various means of facilitating machine or electro-mechanical control within a dynamic sort processing system exist and that any control configuration is within the scope of the teachings described herein. Skilled practitioners will further recognize that the elements or components of the feeder system 100 as presented herein are exemplary in nature. Indeed, the elements and/or components comprising a general feeder system 170 will vary by design and relative to the sorter device it operates in connection with; all the more a reason that a convenient means of adapting feeder control settings relative to a particular customer job is necessary.

In a sort processing environment, it is not uncommon for a sort processing provider to process many different customers' mail items as a job. A particular customer's plurality of mail items are distinguished from another customer's mail items via a customer profile, the customer profile being a data file indicating among other things: the name, address, unique identification of the customer (e.g., customer resource identification, mailer identification) responsible for submitting mail items for process, required mail drop dates for the customer, payment information, mail detail information for the mailing (e.g., metered vs. permit, card based versus standard letter mail items), rate category and postage information, etc. Of course, those skilled in the art will recognize that other data may comprise the data file as well. The customer profile data may be maintained within a database of the sort processing provider in accord with a unique identification (e.g., file name, unique identifier), be it accessible from over a network via the job management system 190, or retrieved from a local sort processing computer 180 operating within the sort processing environment. As such, the customer profile is established in advance of a job run (i.e., to define the parameters, requirements and criteria under which the job is to be executed by the sort processing provider on behalf of a particular customer).

Figure 2:
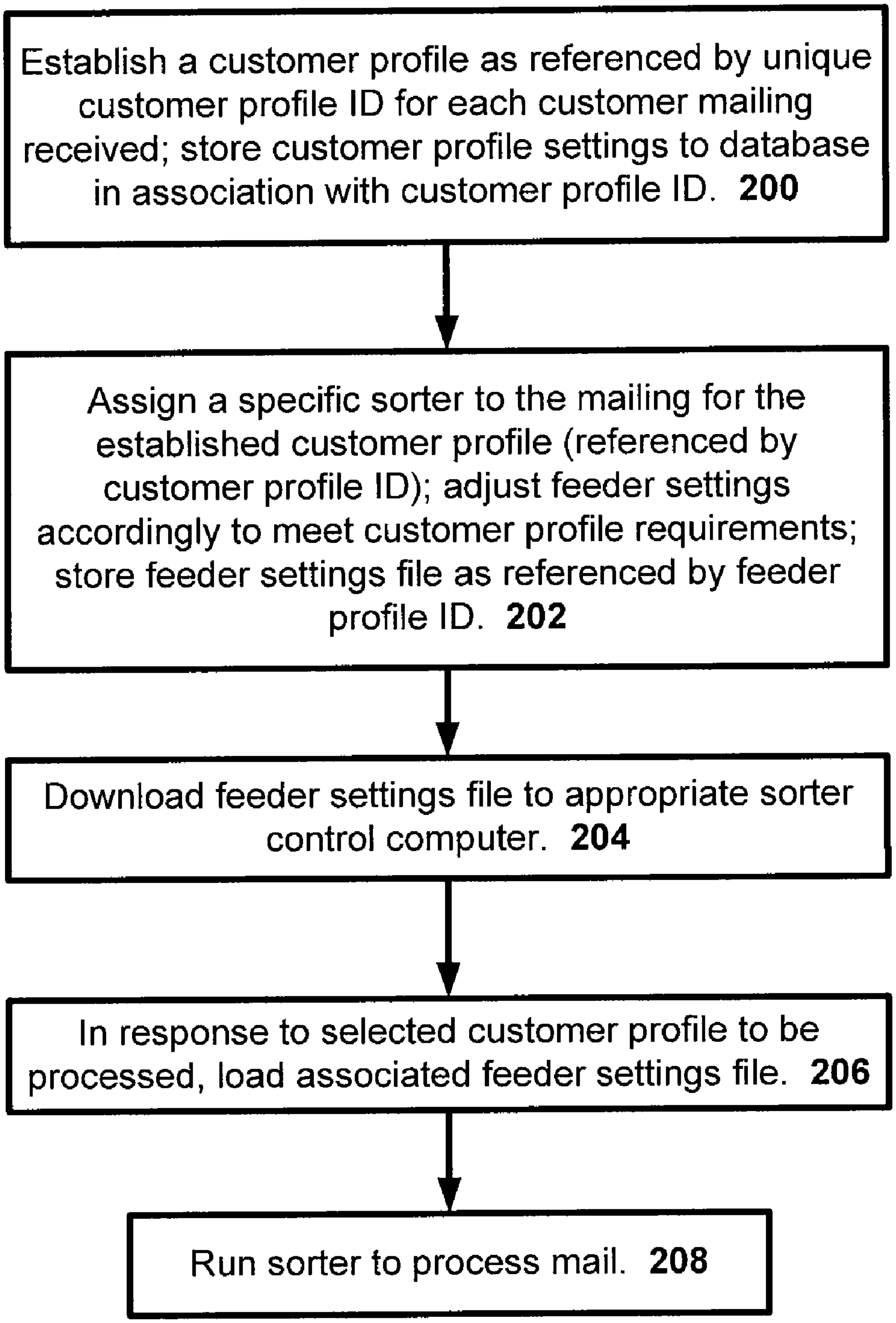
FIG. 2 is a flowchart depicting an exemplary process by which a particular feeder profile may be loaded upon a feeder control system in connection with the feeder system of FIG. 1.

Turning now to FIG. 2, a flowchart depicting the exemplary process by which a particular feeder profile may be loaded upon a feeder control system 170 for execution of a job relative to a specific customer profile is presented. In particular, the flowchart depicts those procedures performed prior to the execution of the job to enable automatic association of the feeder profile by customer job. As a first step, when a mailing (collection of mail items corresponding to a job to be executed) is received from a customer and submitted to the sort processing provider, a customer profile is established and/or updated accordingly, referenced by a unique identifier as mentioned above. The customer profile is updated in instances where the customer is already known to the provider and one or more adjustments are required. Otherwise, the customer profile is created by the sort processing provider for the first time or recalled from a previously stored instance. These processing steps correspond to event 200 the flowchart.

Figure 3:
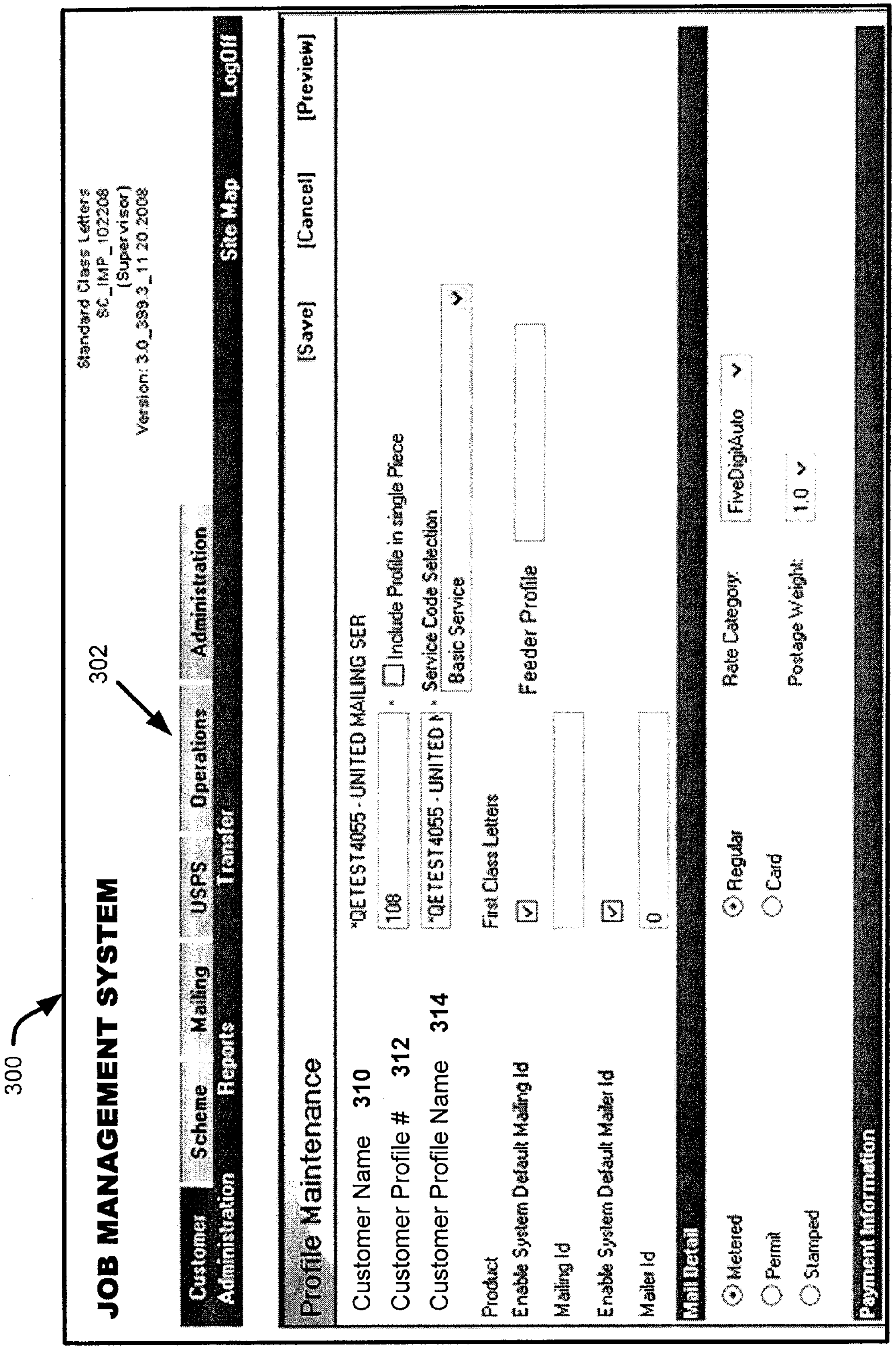
FIGS. 3, 4A, 4B depict exemplary graphical user interfaces for enabling customer profile maintenance, sorter configuration maintenance and feeder profile maintenance respectively.

In either case, a customer profile with assigned customer profile identifier is loaded onto the sort processing provider's job management system 190 (i.e., a server system for maintaining details of the various jobs, resources and requirements to be executed within the sort processing provider's facility). An exemplary graphical user interface 300 to the job management system 190 for enabling customer profile maintenance via monitor device 192 is depicted in FIG. 3. In this example, the customer profile is uniquely referenced in the job management system database with respect to a particular mailing based on a combination of, or one or more of an assigned customer name 310, customer profile number 312 or customer profile name 314. Other profile characteristics, such as the rate category, mail class, billing information, postal authority submission criteria, etc. can also be established via GUI 300. Skilled practitioners will recognize that any means or data (e.g., postal authority assigned serial number, customer reference identifier) for generating a unique identifier in reference to a particular customer job (profile) to be executed is within the scope of the exemplary techniques herein.

Figure 4A:
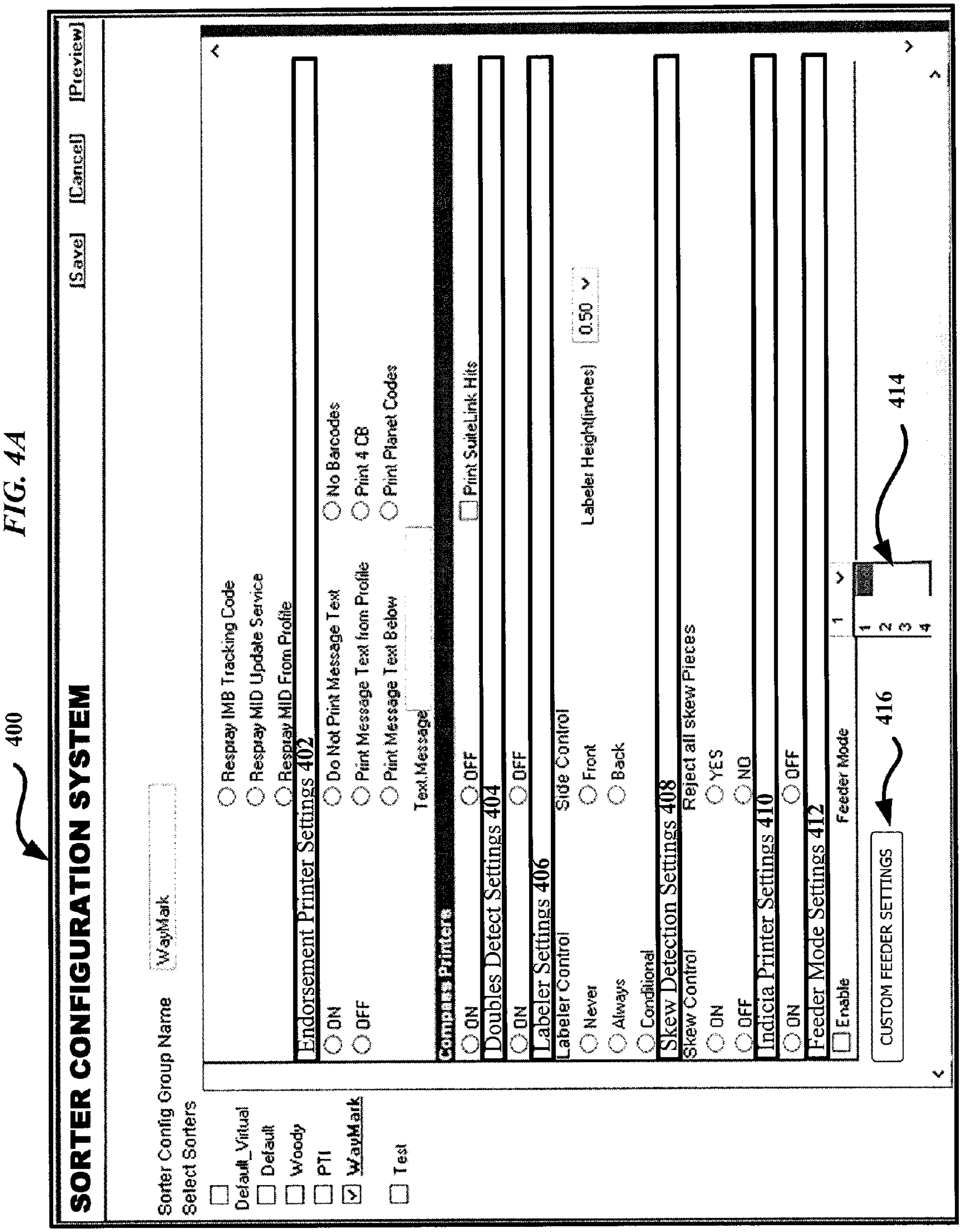

As a next step, a specific sorter is selected and assigned to process the mailing as referenced by customer profile identifier via the job management system 190. For example, once the customer job profile is established, the operator may further select the operations tab 302 from the job management system interface 300 in order to access a machine (sorter) maintenance interface 400 as depicted in FIG. 4. Among other things, the sorter maintenance interface 400 enables selection of the particular sorter to run the job as well as the associated features and controls to be executed during sort processing. This may include the mode of operation of various inline or peripheral devices that contribute to the sort process, including but not limited to adaptation of: endorsement printer settings 402, double detector device settings 404, labeler settings 406, skew detector device settings 408, indicia printer settings 410 and feeder mode settings 412. With regards to the feeder mode settings, the operator may optionally select from a 'menu' 414 of pre-established feeder modes/settings. Alternatively, the operator may customize the feeder control settings relative to the needs of the job to be performed.

Figure 4B:
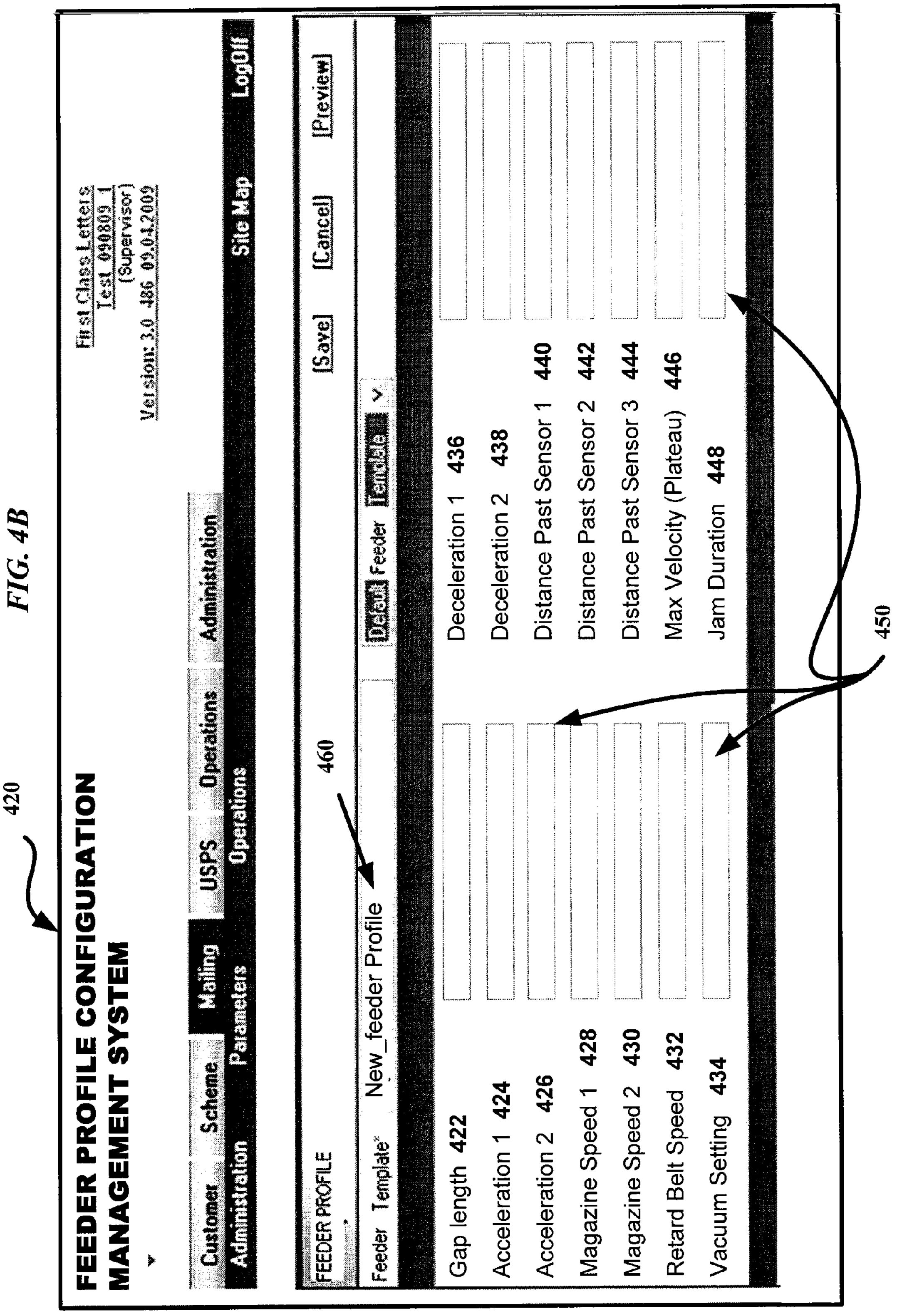

Consider, for example, a scenario wherein the mailing to be processed comprises postcards. In this case, the default settings of the sorter feeder system in question (i.e., mode 1-4 as shown in the drop down menu 414) must suitably accommodate postcards to the desired tolerances for optimizing execution of the job. If the default feeder settings indicated are not suitable, however, the operator may then adjust or customize the feeder settings accordingly to meet requirements via an interface 416 to a feeder profile configuration system 420 of the job management system. As shown in FIG. 4B, this may include adjusting one or more of the following:

| | |
|---|---|
| Gap length | 422 |
| Acceleration 1 | 424 |
| Acceleration 2 | 426 |
| Magazine Speed 1 | 428 |
| Magazine Speed 2 | 430 |
| Retard Belt Speed | 432 |
| Vacuum Setting | 434 |
| Deceleration 1 | 436 |
| Deceleration 2 | 438 |
| Distance Past Sensor 1 | 440 |
| Distance Past Sensor 2 | 442 |
| Distance Past Sensor 3 | 444 |
| Max Velocity (Plateau) | 446 |
| Jam Duration | 448 |

Of course, other parameters beyond those shown may be adapted accordingly. The operator may enter the desired value of each tolerance setting via the plurality of text boxes 450. Furthermore, the feeder profile may be assigned a unique identifier 460 by which it may be referenced for further use or recall. Invariably, skilled practitioners will recognize that the reference may or may not correspond to the identifier value associated with the customer profile as established.

Once adjusted, the updated feeder profile is saved to a database maintained by the job management system 190. As such, the feeder profile (referenced by a unique feeder profile identifier) is associated/linked with a specific mailing or job to be processed (referenced by a customer profile identifier), corresponding to event 202. Once initialized, the feeder profile is then sent to the sorter control computer of the selected sorter for ultimate loading to the feeder control system 170 (event 204). Alternatively, the feeder profile for the sorter is maintained by the job management system 190 until selected for retrieval by the sorter control computer 180. Selection for retrieval will occur in particular just prior to execution of the mailing job to be executed, such as by selection from an interface 194 to the sorter control system 180 or in accordance with a queued execution arrangement, i.e., an ordered list of jobs to be performed by the sorter in order of execution.

Having established a feeder profile in connection with a specific customer profile to be executed, the operator may proceed to load the mailing to be processed by the sorter onto the feeder system 100. In addition, the operator must specify from the sorter control computer 180, via access to the job management system interface 300, the particular customer profile (job) to be executed (e.g., the ordered list or one job at a time). Once selected, the feeder profile associated with that particular customer profile is automatically retrieved and/or loaded directly to the feeder control system 170 to enable the desired operation. Consequently, the settings as specified by the feeder profile, established prior to the start of the job run, are executed by the feeder system 100. This is in direct contrast to the operator having to adjust the feeder settings on the spot through a trial-and-error process, fine tuning or manually via a feeder control instrument panel on a select sampling of the mailing. Moreover, by automatically enabling the association of a particular feeder profile upon selection of a customer profile (job) to be executed, the operator need not adjust the feeder settings for each job changeover. It will be appreciated by skilled artisans that such an approach increases the overall processing throughput of the sort device in question and hence the overall processing capacity of the sort processing service provider.

In consideration of the examples presented, those skilled in the art will recognize that a unique feeder profile identifier once assigned is particular to the specific feeder device settings and job requirements at the time it was created. In some instances, a particular date of assignment or creation may also be associated with a particular customer profile identifier. Consequently, a different feeder profile ID represents different feeder settings at different sites. The same feeder profile ID need not reference the same set of feeder profile settings when the processing context (site, customer, mail mix, etc.) for which it was originally established changes. This is because different machines and different mail mixes may require different customization at a particular site. Moreover, one sort processing provider site may process certain kinds of mail that another site completely avoids or doesn't receive from their customers. For this reason, various version control methods and techniques may be employed for in conjunction with the examples presented herein so as to enable data file creation relative to differing processing contexts. So, for example, Feeder Profile 1 version A relative to Customer 1 for usage at Sort Processing Site 1 may be readily suited for usage at a Sort Processing Site 2 as Feeder Profile 1 version B.

Figure 5:
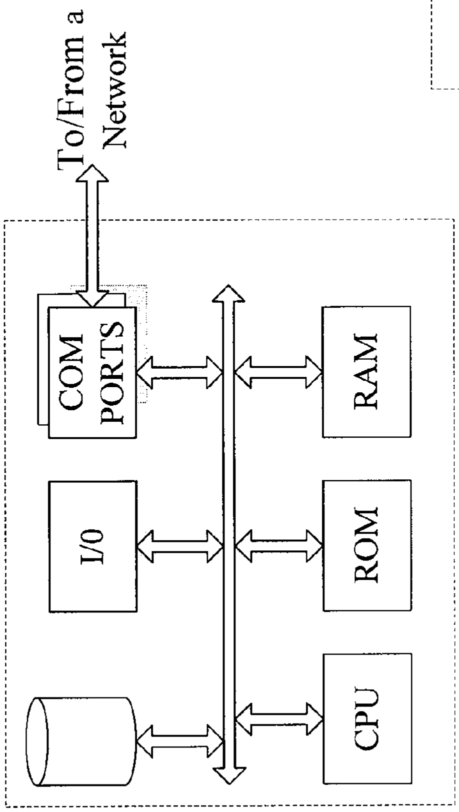
FIG. 5 illustrates a network or host computer platform, as may typically be used to implement a server.
Figure 6:
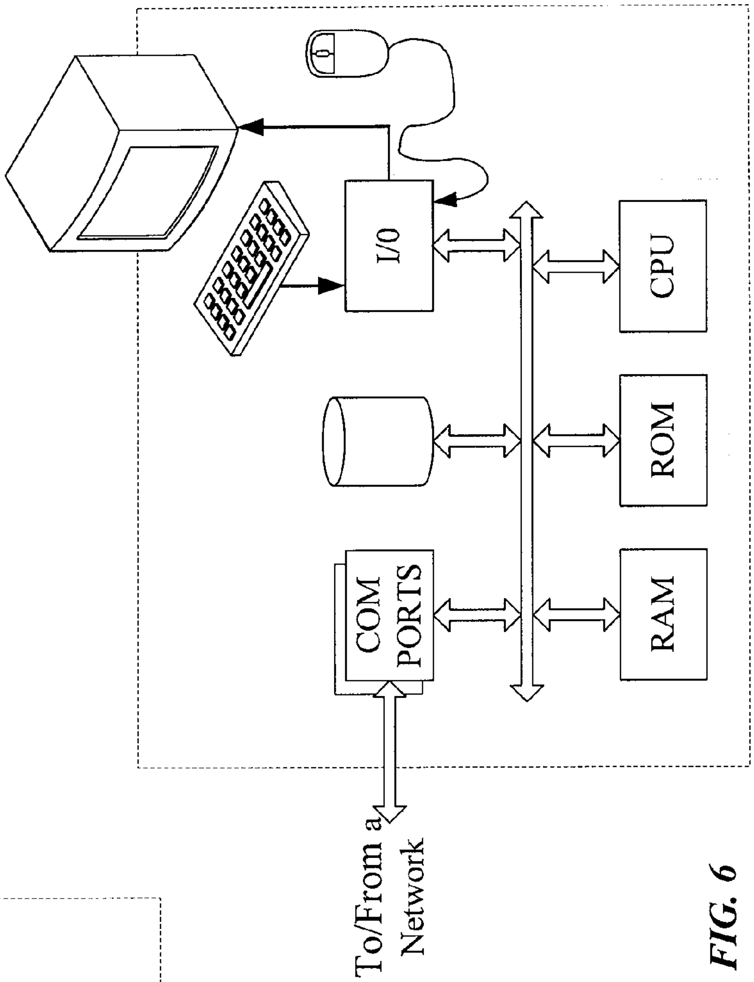
FIG. 6 depicts a computer with user interface elements.

FIGS. 5 and 6 provide functional block diagram illustrations of general purpose computer hardware platforms. FIG.

5 illustrates a network or host computer platform, as may typically be used to implement a server. FIG. 6 depicts a computer with user interface elements, as may be used to implement a personal computer or other type of work station or terminal device, although the computer of FIG. 6 may also act as a server if appropriately programmed. It is believed that those skilled in the art are familiar with the structure, programming and general operation of such computer equipment and, as a result, the drawings should be self-explanatory.

For example, cutting mechanism 114 may be a PC based implementation of a central control processing system like that of FIG. 6, or may be implemented on a platform configured as a central or host computer or server like that of FIG. 5. Such a system typically contains a central processing unit (CPU), memories and an interconnect bus. The CPU may contain a single microprocessor (e.g. a Pentium microprocessor), or it may contain a plurality of microprocessors for configuring the CPU as a multi-processor system. The memories include a main memory, such as a dynamic random access memory (DRAM) and cache, as well as a read only memory, such as a PROM, an EPROM, a FLASH-EPROM, or the like. The system memories also include one or more mass storage devices such as various disk drives, tape drives, etc.

In operation, the main memory stores at least portions of instructions for execution by the CPU and data for processing in accord with the executed instructions, for example, as uploaded from mass storage. The mass storage may include one or more magnetic disk or tape drives or optical disk drives, for storing data and instructions for use by CPU. For example, at least one mass storage system in the form of a disk drive or tape drive, stores the operating system and various application software as well as data, such as sort scheme instructions and image data generated in response to the interpretation of any markings revealed after cutting of the mail piece. The mass storage within the computer system may also include one or more drives for various portable media, such as a floppy disk, a compact disc read only memory (CD-ROM), or an integrated circuit non-volatile memory adapter (i.e. PC-MCIA adapter) to input and output data and code to and from the computer system.

The system also includes one or more input/output interfaces for communications, shown by way of example as an interface for data communications with one or more other processing systems such as the reader device 116, the print heads 118 and print verification device 120. In a document processing environment, such as in the case of sorting, computer communications may extend to other processing equipment and to various sorting elements, such as sort bins 122. Although not shown, one or more such interfaces may enable communications via a network, e.g., to enable sending and receiving instructions electronically. The physical communication links may be optical, wired, or wireless.

The computer system may further include appropriate input/output ports for interconnection with a display and a keyboard serving as the respective user interface for the processor/controller. For example, a printer control computer in a document factory may include a graphics subsystem to drive the output display. The output display, for example, may include a cathode ray tube (CRT) display, or a liquid crystal display (LCD) or other type of display device. The input control devices for such an implementation of the system would include the keyboard for inputting alphanumeric and other key information. The input control devices for the system may further include a cursor control device (not shown), such as a mouse, a touchpad, a trackball, stylus, or cursor direction keys. The links of the peripherals to the system may be wired connections or use wireless communications.

The computer system runs a variety of applications programs and stores data, enabling one or more interactions via the user interface provided, and/or over a network to implement the desired processing, in this case, including those for processing document data as discussed above.

The components contained in the computer system are those typically found in general purpose computer systems. Although summarized in the discussion above mainly as a PC type implementation, those skilled in the art will recognize that the class of applicable computer systems also encompasses systems used as host computers, servers, workstations, network terminals, and the like. In fact, these components are intended to represent a broad category of such computer components that are well known in the art.

Hence aspects of the techniques discussed herein encompass hardware and programmed equipment for controlling the relevant document processing as well as software programming, for controlling the relevant functions. A software or program product, which may be referred to as an "article of manufacture" may take the form of code or executable instructions for causing a computer or other programmable equipment to perform the relevant data processing steps regarding document printing and associated imaging and print quality verification, where the code or instructions are carried by or otherwise embodied in a medium readable by a computer or other machine. Instructions or code for implementing such operations may be in the form of computer instruction in any form (e.g., source code, object code, interpreted code, etc.) stored in or carried by any readable medium.

Such a program article or product therefore takes the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the relevant software from one computer or processor into another, for example, from a management server or host computer into the image processor and comparator. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the sorting control and attendant mail item tracking based on unique mail item identifier. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method of automatically configuring a feeder system of a mail sorting system to optimize the performance of the sorter in accordance with the characteristics of the customer's mail, the method comprising steps of:

receiving, at a sorter control system associated with the mail sorting system, customer information associated with a processing job, the customer information including a unique customer identifier and parameters for the processing job;

obtaining at the sorter control system, from a database, a feeder profile associated with the unique customer identifier, the feeder profile including parameters for controlling the operation of the feeder system of the mail sorting system;

receiving the feeder profile at a feeder control system in communication with the sorter control system, the feeder control system capable of configuring one or more parameters of the feeder system; and automatically configuring, by the feeder control system, the feeder system according to the parameters of the feeder profile associated with the unique customer identifier prior to the execution of the processing job by the mail sorting system.

2. The method of claim 1, wherein the step of automatically configuring the feeder control system according to the parameters of the feeder profile includes configuring a parameter selected from the group consisting of:

gap threshold between successive items of the processing job, pitch threshold between items of the processing job, vacuum suction pressure to be applied for feeding items of the processing job onto a transport, magazine feed velocity, magazine mail stack pressure, belt motor acceleration rate, belt motor deceleration rate, and retard belt speed.

3. The method of claim 1, wherein the step of obtaining the feeder profile comprises:

sending a request for retrieval of the feeder profile, including the unique customer identifier, over a network from the sort control system to a job management system having access to the database; and receiving the feeder profile over the network at the sort control system from the job management system.

4. The method of claim 1, wherein the step of receiving the customer information associated with the processing job comprises receiving the customer information, over a network from a job management system in communication with the sort control system.

5. The method of claim 1, wherein the feeder profile is a default feeder profile associated with the sort processing device.

6. The method of claim 1, wherein the feeder profile is a customized feeder profile associated with the sort processing device.

7. A document processing system comprising:

a sort processing device having an integral feeder system;

a sorter control system in communication with the sorting device and a database, the sorter control system receiving customer information associated with a processing job, the customer information including a unique customer identifier and parameters for the processing job and obtaining from the database a feeder profile associated with the unique customer identifier, the feeder profile including parameters for controlling the operation of the feeder system of the sort processing device; and a feeder control system in communication with the feeder system and the sort control system, the feeder control system receiving the feeder profile and automatically configuring the feeder system according to the parameters of the feeder profile associated with the unique customer identifier prior to the execution of the processing job by the sort processing device.

8. The system of claim 7, wherein the database is resident on a communications network.

9. The system of claim 7, further comprising a job management system in communication with the sort control system, the job management system storing the customer information and parameters for the processing job.

10. The system of claim 7, wherein the feeder profile includes configuring a parameter selected from the group consisting of:

gap threshold between successive items of the processing job, pitch threshold between items of the processing job, vacuum suction pressure to be applied for feeding items of the processing job onto a transport, magazine feed velocity, magazine mail stack pressure, belts motor acceleration rate, belt motor deceleration rate, and retard belt speed.

11. The system of claim 7, wherein the feeder profile is a default profile.

12. The system of claim 7, wherein the feeder profile is a custom profile.

13. The system of claim 7, wherein the feeder profile is represented by a unique identifier.

14. An article of manufacture comprising:

a machine readable storage medium; and executable program instructions embodied in the machine readable storage medium that when executed by one or more programmable systems in communication with a document processing system having a sorter processing device that causes the one or more systems to perform functions that automatically configure a feeder system of the sorter processing device, the functions comprising:

receiving, at a sorter control system associated with the sorter processing device, customer information associated with a processing job, the customer information including a unique customer identifier and parameters for the processing job to be executed;

obtaining, at the sorter control system, from a database, a feeder profile associated with the unique customer identifier, the feeder profile including parameters for controlling the operation of the feeder system of the sorter processing device;

receiving the feeder profile at a feeder control system in communication with the sorter control system, the feeder control system capable of configuring one or more parameters of the feeder system; and automatically configuring, by the feeder control system, the feeder system according to the parameters of the feeder profile associated with the unique customer identifier upon receipt of the feeder profile prior to the execution of the processing job by the sort processing device.

15. The article of manufacture of claim 14, wherein the function of automatically configuring the feeder control system according to the parameters of the feeder profile includes configuring a parameter selected from the group consisting of:

gap threshold between successive items of the processing job, pitch threshold between items of the processing job, vacuum suction pressure to be applied for feeding items of the processing job onto a transport, magazine feed velocity, magazine mail stack pressure, belts motor acceleration rate, belt motor deceleration rate, and retard belt speed.

16. The article of manufacture of claim 14, wherein the function of obtaining the feeder profile comprises the functions of:

sending a request for retrieval of the feeder profile, including the unique customer identifier, over a network from the sort control system to a job management system having access to the database; and receiving the feeder profile over the network at the sort control system from the job management system.

17. The article of manufacture of claim 14, wherein the function of receiving the customer information associated with the processing job comprises the function of receiving the customer information, over a network from a job management system in communication with the sort control system.

18. The article of manufacture of claim 14, wherein the feeder profile is a default feeder profile associated with the sort processing device.

19. The article of manufacture of claim 14, wherein the feeder profile is a custom feeder profile associated with the sort processing device.

* * * * *